(12) United States Patent
Cheng

(10) Patent No.: US 6,640,748 B1
(45) Date of Patent: Nov. 4, 2003

(54) VENTILATION OF A WATER RESERVOIR OF A DRINKING FOUNTAIN FOR A PET

(76) Inventor: Chen Hui Cheng, No. 172, Lun-Mei Rd., Chang Hua City, Chang Hua Hsien (TW)

( * ) Notice: Subject to any disclaimer, the term of this patent is extended or adjusted under 35 U.S.C. 154(b) by 0 days.

(21) Appl. No.: 10/340,824

(22) Filed: Jan. 13, 2003

(51) Int. Cl.[7] ................................................ A01K 7/00
(52) U.S. Cl. ........................................ 119/72; 119/72.5
(58) Field of Search ............................ 119/72, 74, 725, 119/75, 78; D7/312

(56) References Cited

U.S. PATENT DOCUMENTS

| | | | | |
|---|---|---|---|---|
| 4,840,143 A | * | 6/1989 | Simon | 119/52.1 |
| 5,293,836 A | * | 3/1994 | Hostetler | 119/72 |
| 5,549,074 A | * | 8/1996 | Hui | 119/477 |
| 5,669,329 A | * | 9/1997 | Krause | 119/72.5 |
| 5,934,222 A | * | 8/1999 | Hwang | 119/72 |
| 6,003,468 A | * | 12/1999 | Edstrom et al. | 119/72.5 |
| 6,079,361 A | * | 6/2000 | Bowell et al. | 119/72 |

* cited by examiner

*Primary Examiner*—Michael J. Carone
*Assistant Examiner*—Judith A. Nelson
(74) *Attorney, Agent, or Firm*—Harrison & Egbert

(57) ABSTRACT

A pet fountain includes a water reservoir, and a spout connected with a water discharging end of the water reservoir. The water reservoir is provided in a ventilation end with a through hole, and an elastic ventilation block. The elastic ventilation block is provided with a fitting portion, and a projection extending from the fitting portion which is fitted airtightly and removably into the through hole of the ventilation end and is provided with a ventilation hole. The projection is extended into the interior of the water reservoir and is provided with a slit in communication with the ventilation hole of the fitting portion.

4 Claims, 6 Drawing Sheets

VENTILATION OF A WATER RESERVOIR OF A DRINKING FOUNTAIN FOR A PET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a pet fountain, and more particularly to a water reservoir of the pet fountain.

BACKGROUND OF THE INVENTION

The conventional pet fountain comprises an airtight water reservoir, which is bound to create therein a vacuum as a result of the drop in water level in the reservoir. The creation of the vacuum in the water reservoir tends to hamper the discharge of water from the spout of the pet fountain.

BRIEF SUMMARY OF THE INVENTION

The primary objective of the present invention is to provide a pet fountain with a water reservoir which is free of the deficiency of the water reservoir of the conventional pet fountain described above.

In keeping with the principle of the present invention, the foregoing objective of the present invention is attained by a pet fountain comprising a water reservoir which is provided with a means to ventilate the water reservoir so as to avert the creation of a vacuum in the water reservoir. The ventilation of the present invention comprises an elastic ventilation block which is securely held in a through hole of the water reservoir and is provided with a ventilation hole and an air slit in communication with the interior of the water reservoir and the ventilation hole. The internal atmospheric pressure of the water reservoir remains the same as the external atmospheric pressure of the water reservoir by virtue of the ventilation block.

The features and the advantages of the present invention will be more readily understood upon a thoughtful deliberation of the following detailed description of the present invention with reference to the accompanying drawings.

DETAILED DESCRIPTION OF THE INVENTION

Figure 1:
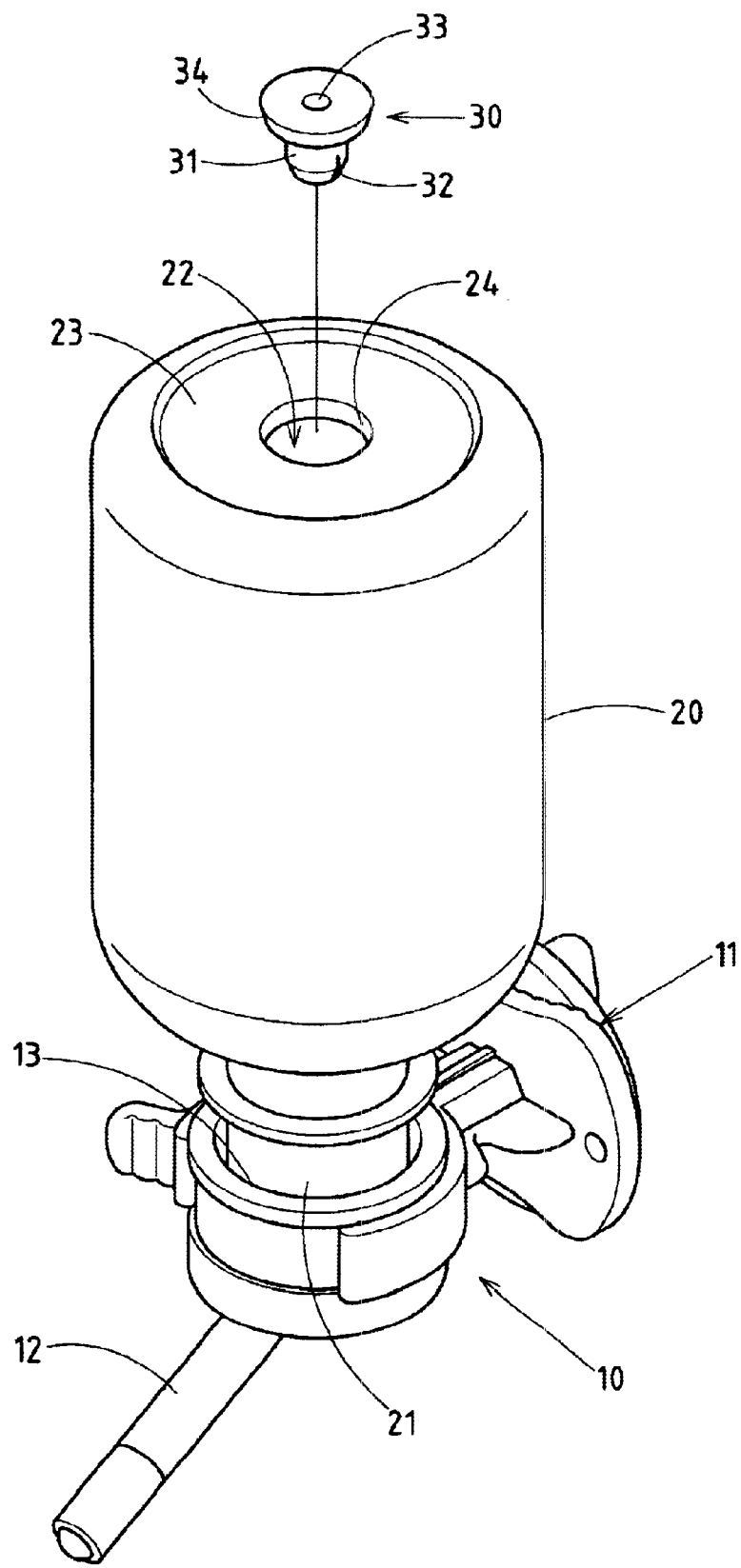
FIG. 1 shows an exploded perspective view of a preferred embodiment of the present invention.
Figure 2:
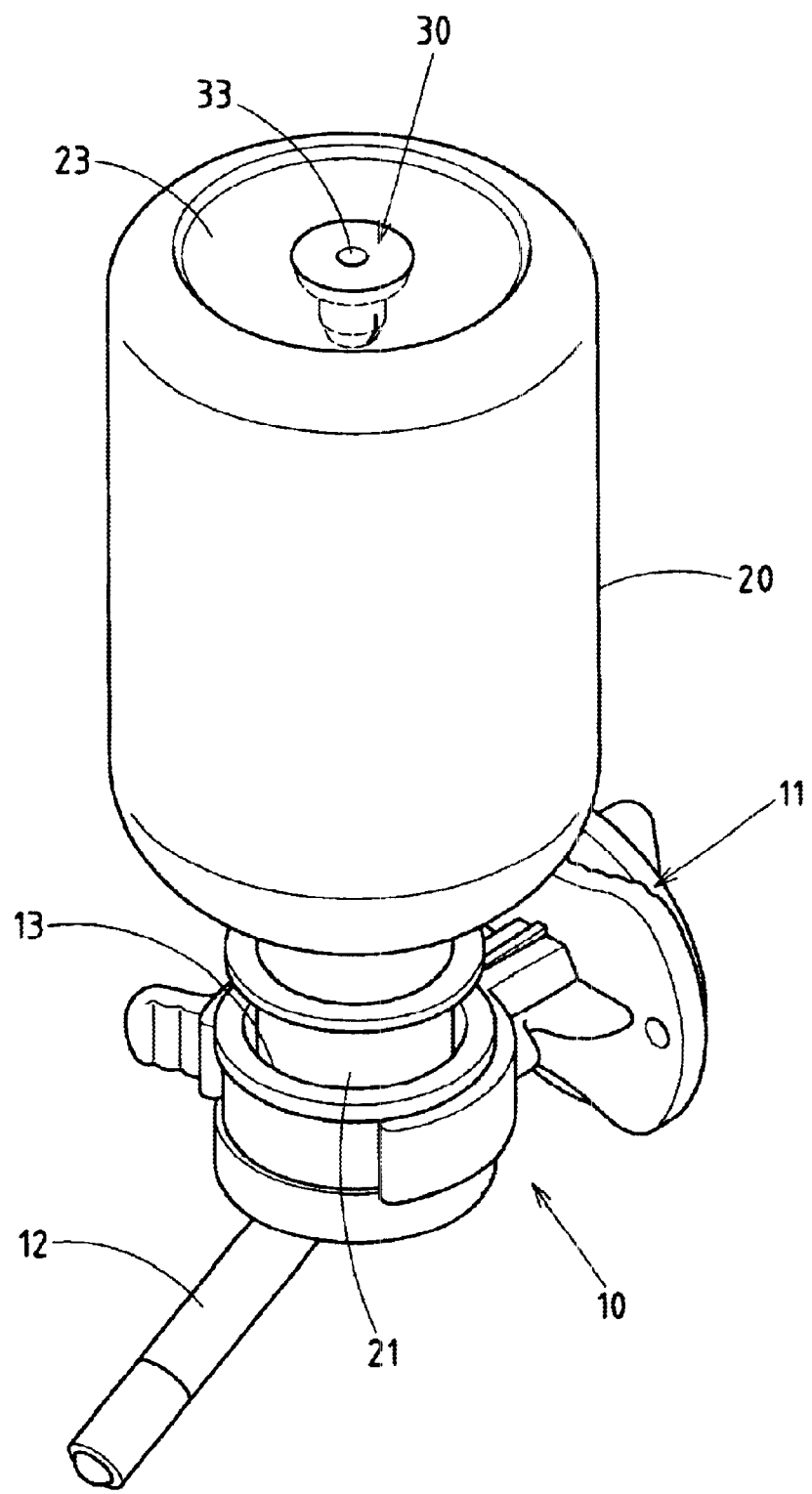
FIG. 2 shows a perspective view of the preferred embodiment of the present invention.

As shown in FIGS. 1–4, a pet fountain 10 embodied in the present invention comprises a fastening frame 11, a spout 12, and a water reservoir 20. The pet fountain I 0 is fastened to a cage (not shown in the drawings) by the fastening frame 11. The water reservoir 20 has a water discharging end 21, which is connected with the spout 12 by a connector 13.

The water reservoir 20 of the present invention further has a ventilation end 23, which is provided with a through hole 22 and an elastic ventilation block 30 which is airtightly fitted into the through hole 22. The through hole 22 is in communication with the interior of the water reservoir 20. The elastic ventilation block 30 is provided with a fitting portion 34 and a projection 31 extending from the fitting portion 34. The fitting portion 34 is provided with a ventilation hole 33 while the projection 31 is provided with a slit 32 in communication with the ventilation hole 33. The elastic ventilation block 30 is removably fitted into the through hole 22 of the ventilation end 23 of the water reservoir 20 in such a way that the fitting portion 34 is airtightly fitted with an inner wall 24 of the through hole 22, as shown in FIG. 3, and that the projection 31 is extended into the interior of the water reservoir 20, and further that the interior of the water reservoir 20 is in communication with the atmospheric air via the slit 32 of the projection 31 and the ventilation hole 33 of the fitting portion 34.

Figure 3:
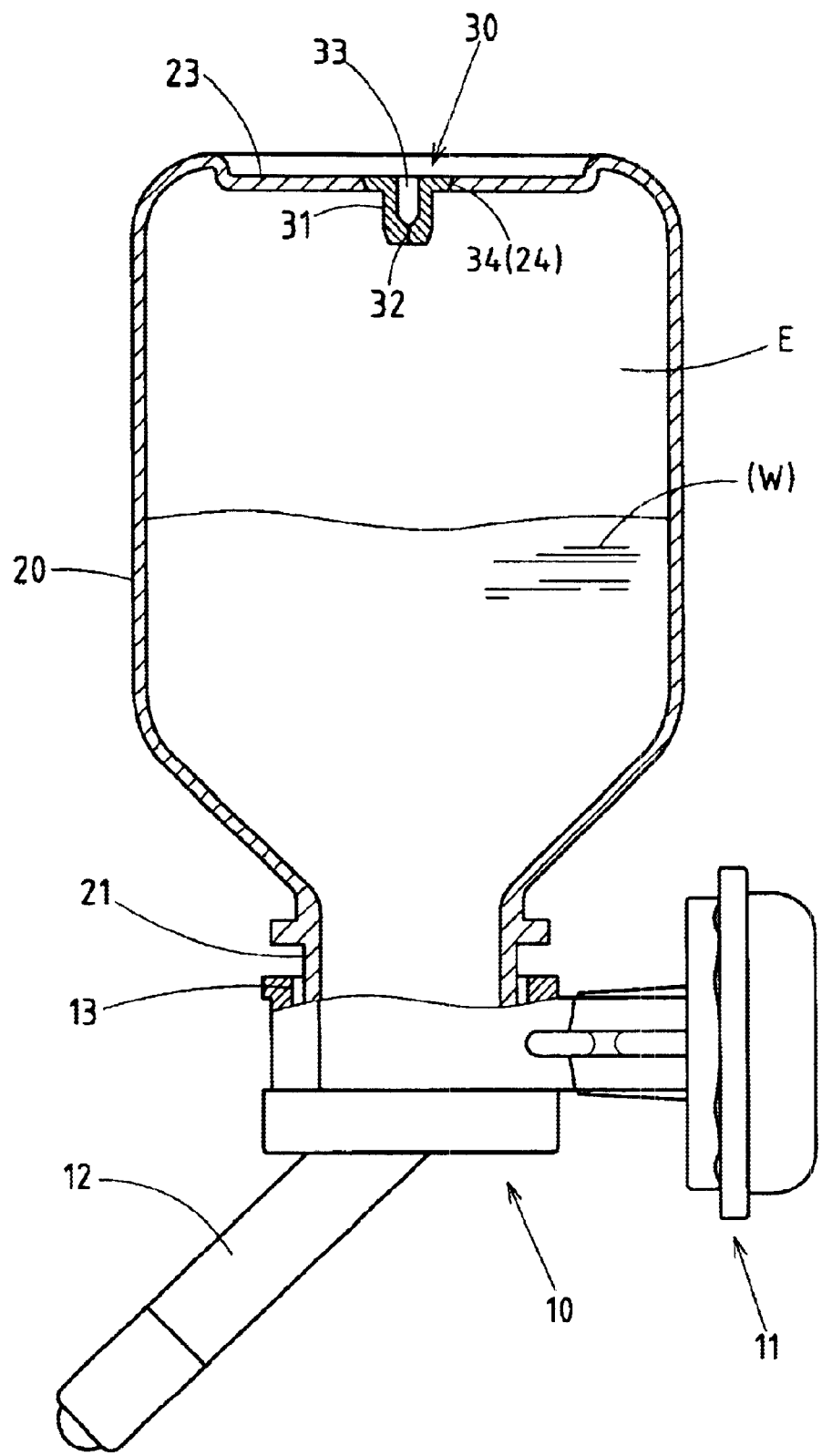
FIG. 3 shows a sectional schematic view of the preferred embodiment of the present invention as shown in FIG. 2.

As illustrated in FIG. 3, an empty space "E" is formed in the water reservoir 20 as a result of the continuous drop in the level of water "W" contained in the interior of the water reservoir 20. However, the internal atmospheric pressure of the empty space "E" remains the same as the external atmospheric pressure of the water reservoir 20, thanks to the ventilation block 30.

Figure 4:
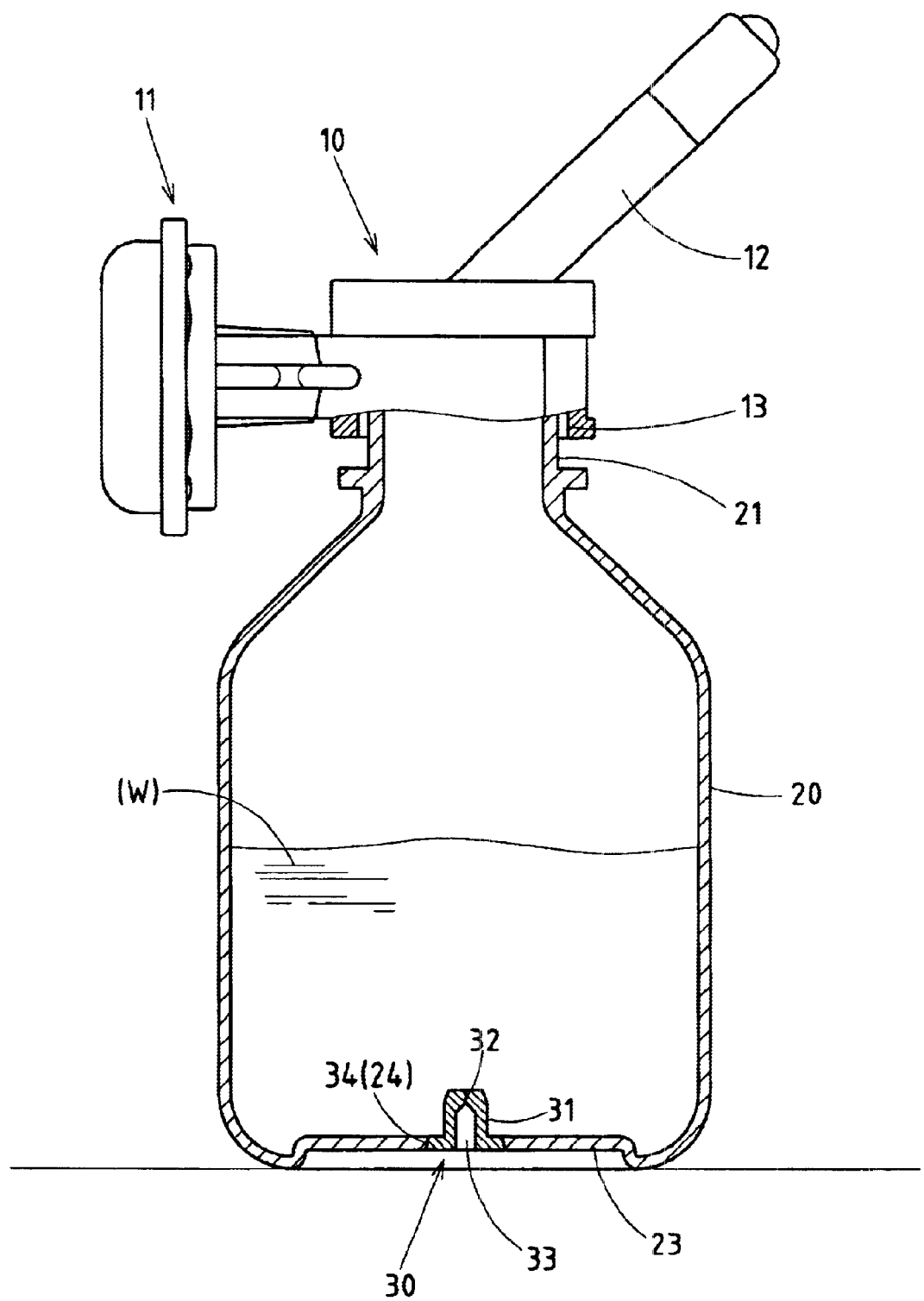
FIG. 4 shows a sectional schematic view of the preferred embodiment of the present invention held upside down.

In light of the elastic nature of the ventilation block 30, the water leak is averted at the slit 32 even if the pet fountain 10 is held upside down, as illustrated in FIG. 4.

In order to enhance the airtight association of the fitting portion 34 of the ventilation block 30 with the inner wall 24 of the through hole 22 of the ventilation end 23 of the water reservoir 20, the fitting portion 34 of the ventilation block 30 is of a tapered construction. Accordingly, the through hole 22 is a tapered through hole which matches the tapered fitting portion 34.

Figure 5:
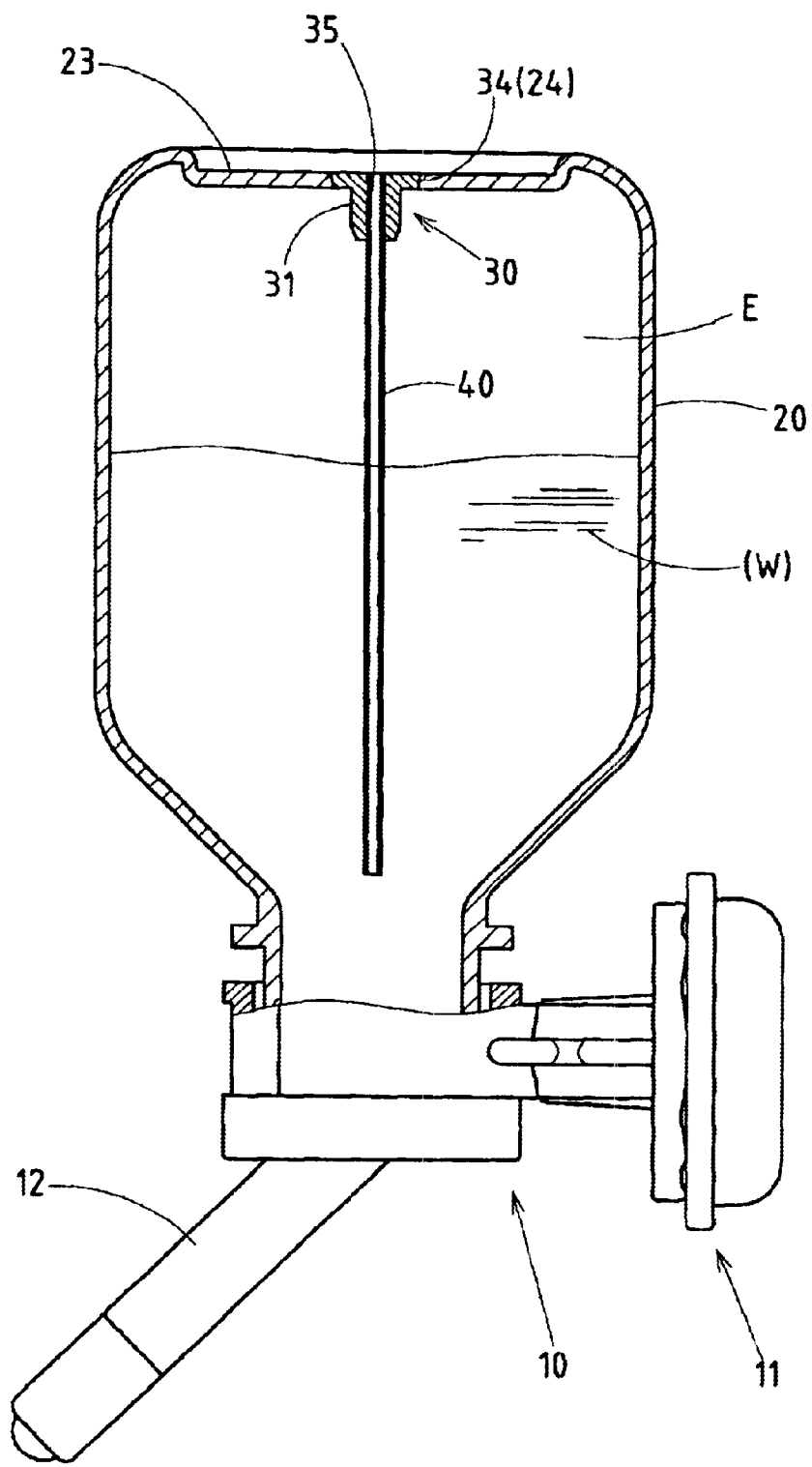
FIG. 5 shows a sectional schematic view of a second preferred embodiment of the present invention.
Figure 6:
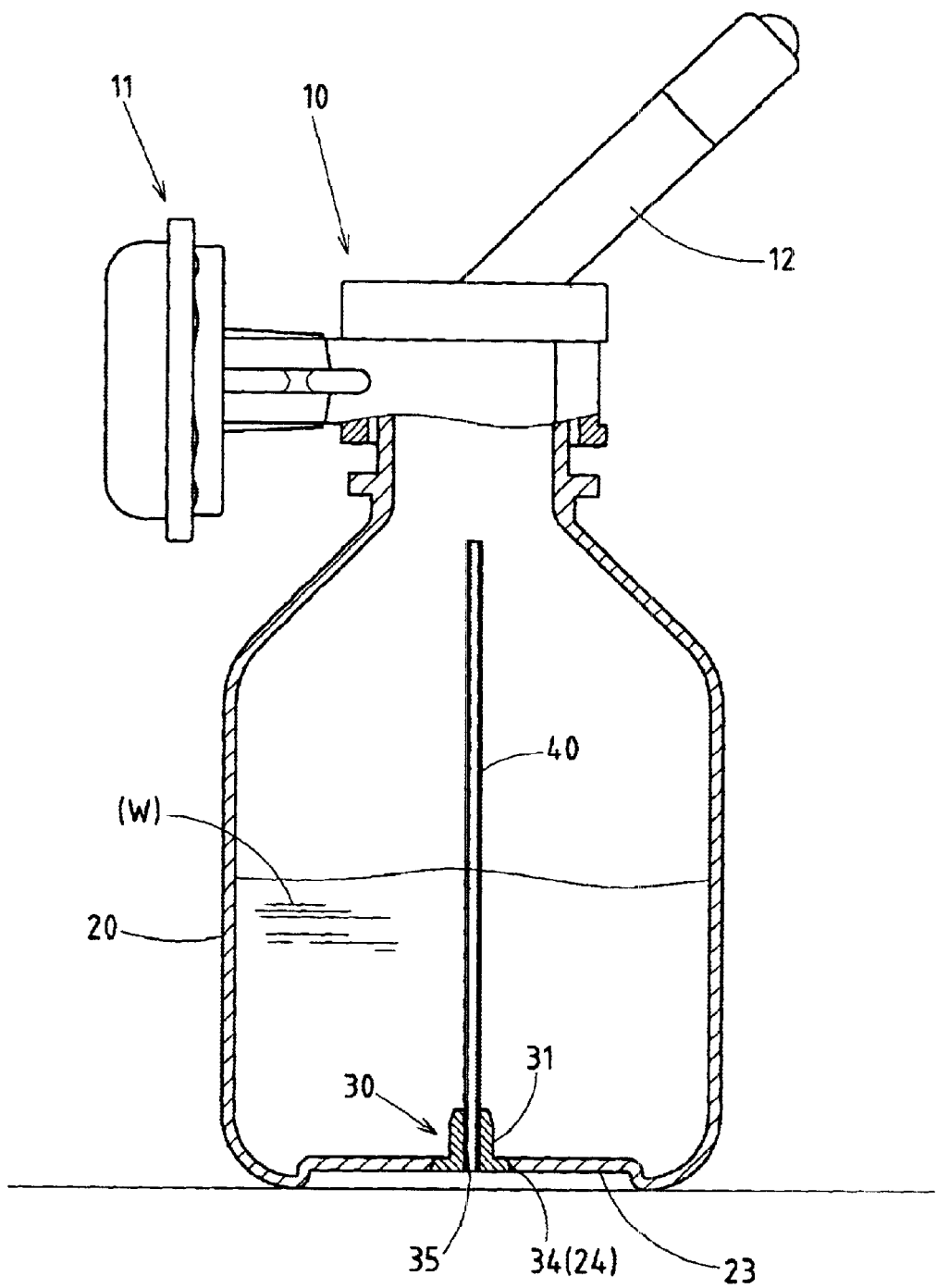
FIG. 6 shows an upside-down sectional schematic view of the second preferred embodiment of the present invention as shown in FIG. 5.

The present invention described above is to be regarded in all respects as being illustrative and nonrestrictive. Accordingly, the present invention may be embodied in other specific forms without deviating from the spirit thereof. For example, the ventilation block 30 of the present invention may be provided with a through hole 35 and a ventilation tube 40 in place of the ventilation hole 33 and the slit 32, as shown in FIG. 5. The ventilation tube 40 is held at one end by the through hole 35 of the ventilation block 30 such that the other end of the ventilation tube 40 is dipped into the water "W" contained in the interior of the water reservoir 20. The ventilation tube 40 averts the water leak even if the pet fountain 10 is held upside down, as illustrated in FIG. 6. The present invention is therefore to be limited only by the scope of the following claims.

I claim:

1. A pet fountain comprising:

a water reservoir comprised of a water discharging end; and a spout connected with said water discharging end water reservoir;

wherein said water reservoir is further comprised of a ventilation end which is comprised of a through hole in communication with an interior of said water reservoir, and an elastic ventilation block dimensioned to fit airtightly into said through hole, said elastic ventilation block being comprised of a fitting portion and a projection extending from said fitting portion, said fitting portion comprised of a ventilation hole, said projection comprised of a slit in communication with said ventilation hole of said fitting portion whereby elastic ventilation block is fitted airtightly and removably into said through hole of said ventilation end of said water reservoir such that said fitting portion is received airtightly and removably in said through hole, such that said projection is extended into the interior of said water reservoir, such that the interior of said water reservoir, and such that the interior of said water reservoir is in communication with atmospheric air via said slit of said projection and said ventilation hole of said fitting portion.

2. The pet fountain as defined in claim 1, wherein said fitting portion of said elastic ventilation block of said ventilation end of said water reservoir is of a tapered construction; wherein said through hole of said ventilation end of said water reservoir is tapered to match said fitting portion.

3. The pet fountain as defined in claim 1, wherein said elastic ventilation block is comprised of a through hole in place of said ventilation hole and said slit, said elastic ventilation block further comprised of a ventilation tube whereby said ventilation tube is held at one end in said through hole of said elastic ventilation block such that another end of said ventilation tube is dipped into water contained in the interior of said water reservoir.

4. The pet fountain as defined in claim 2, wherein said elastic ventilation block is comprised of a through hole in place of said ventilation hole and said slit, said elastic ventilation block further comprised of a ventilation tube whereby said ventilation tube is held at one end in said through hole of said elastic ventilation block such that another end of said ventilation tube is dipped into water contained in an interior of said water reservoir.

* * * * *